United States Patent
Wei et al.

(10) Patent No.: US 9,104,742 B1
(45) Date of Patent: Aug. 11, 2015

(54) METHOD AND SYSTEM FOR OPTIMIZED PARALLEL QUEUING

(71) Applicant: EMC Corporation, Hopkinton, MA (US)

(72) Inventors: Shu-Shang Sam Wei, Danville, CA (US); Dmitry Yuryevich Korshunov, Pleasanton, CA (US); Linda J. Wong, Dublin, CA (US)

(73) Assignee: EMC CORPORATION, Hopkinton, MA (US)

( * ) Notice: Subject to any disclaimer, the term of this patent is extended or adjusted under 35 U.S.C. 154(b) by 331 days.

(21) Appl. No.: 13/798,916

(22) Filed: Mar. 13, 2013

(51) Int. Cl.
| G06F 17/30 | (2006.01) |
| G06F 15/00 | (2006.01) |
| G06F 3/00 | (2006.01) |
| G06F 15/16 | (2006.01) |

(52) U.S. Cl.
CPC ...... *G06F 17/30581* (2013.01); *G06F 17/3089* (2013.01); *G06F 15/16* (2013.01); *G06F 17/30165* (2013.01); *G06F 17/30194* (2013.01); *G06F 17/30876* (2013.01)

(58) Field of Classification Search
CPC .......... G06F 17/3089; G06F 17/30876; G06F 17/30165; G06F 17/30017; G06F 17/30091; G06F 17/30194; G06F 15/16; G06Q 10/10; G06Q 10/101

USPC ................ 707/607, 609, 610, 703, 705, 822; 715/200, 203, 205, 230, 233; 709/213, 709/214, 227, 231
See application file for complete search history.

(56) References Cited

U.S. PATENT DOCUMENTS

| 6,601,087 | B1 * | 7/2003 | Zhu et al. ...................... 709/205 |
| 6,675,205 | B2 * | 1/2004 | Meadway et al. ............ 709/219 |
| 7,203,755 | B2 * | 4/2007 | Zhu et al. ...................... 709/227 |
| 2013/0110890 | A1 * | 5/2013 | Bailor ............................ 707/827 |
| 2013/0110892 | A1 * | 5/2013 | Wood et al. ................... 707/827 |
| 2013/0305163 | A1 * | 11/2013 | Farmer et al. ................. 715/748 |

* cited by examiner

*Primary Examiner* — Cheryl Lewis
(74) *Attorney, Agent, or Firm* — Dergosits & Noah LLP; Todd A. Noah

(57) ABSTRACT

A method and system for sharing and synchronizing content between a content repository and file sharing service. An application server includes a connector engine and a connector agent. The connector engine with is configured with a plurality of threads and queues designed to listen for changes at either the file sharing service or the repository, to process those changes in parallel, and to coordinate synchronization of uploads to the file sharing service and downloads to the content repository.

19 Claims, 19 Drawing Sheets

*Object: dm_relation_type*

- parent_type: dm_document
- child_type: dm_relation
- relation_name: DMC_SYNC_STATUS
- copy_child: 0 (don't copy child when parent is copied)
- direction_kind: 0 (from parent to child)
- integrity_kid: 2 (cascade delete)
- permanent_link: 0 (don't maintain the relation when parent is versioned or copied, BPM needs to maintain it.)
- security_type: CHILD (Whoever can delete the relation object, i.e., the child)

Fig. 6A

*Subtype: dm_relation to dm_relation_sync_status*

- parent_id: will store the chronicle id of an object.
- child_id: will store the id of the relation object itself.
- relation_name: will store DMC_SYNC_STATUS.
- effective_date: will record the start time when the content is uploaded to Syncplicity
- expiration_date: will record the end time when the content is uploaded to Syncplicity
- syncpoint_id, char(20): a new attribute for syncpoint id.
- relative_object_path, char(256), a new attribute for the relative path to the shared folder in the repo where the object resides. If it is directly under the shared folder, then it has the value '/'
- sync_status, char(16): a new attribute with
  - sync_root
  - sync_ok
  - sync_failed
  - sync_in_progress

Fig. 6B

METHOD AND SYSTEM FOR OPTIMIZED PARALLEL QUEUING

TECHNICAL FIELD

This disclosure relates generally to the field of content sharing and synchronization, and more particularly, to systems and methods for synchronizing content shared among multiple computing devices using parallel threading and queueing of data.

BACKGROUND

Content repositories and content management systems, such as the Documentum® content management platform, are multi-user environments, i.e., many users are accessing the same repository at the same time. File sharing and synchronization services, such as the Syncplicity® platform, are single-user systems, where a single user may have multiple computing devices all sharing the same content, as managed by the file service. This disparity creates complexities when trying to map content from a repository to a file sharing service. For example, multiple users can update/create/rename/delete files and folders at the same time.

It would thus be desirable to provide a mechanism for integrating synchronization services with repository services.

BRIEF DESCRIPTION OF THE DRAWINGS

FIGS. 6A and 6B are representations of a data object and its subtypes.

DETAILED DESCRIPTION

1. Overview: Integrating Synchronization with Content Management

This disclosure describes a connector configured to enable sharing and synchronization of content between a data repository, such as the Documentum® content management platform, and a file sharing/synchronization service, such as the Syncplicity® service. Such a connector allows content in the repository to be shared and synchronized with all computing devices that are linked through the file sync service. Further, while specific detailed embodiments of a synchronization connector between the Documentum platform and the Syncplicity platform are described herein, the synchronization connector may be adapted other platforms.

Figure 1A:
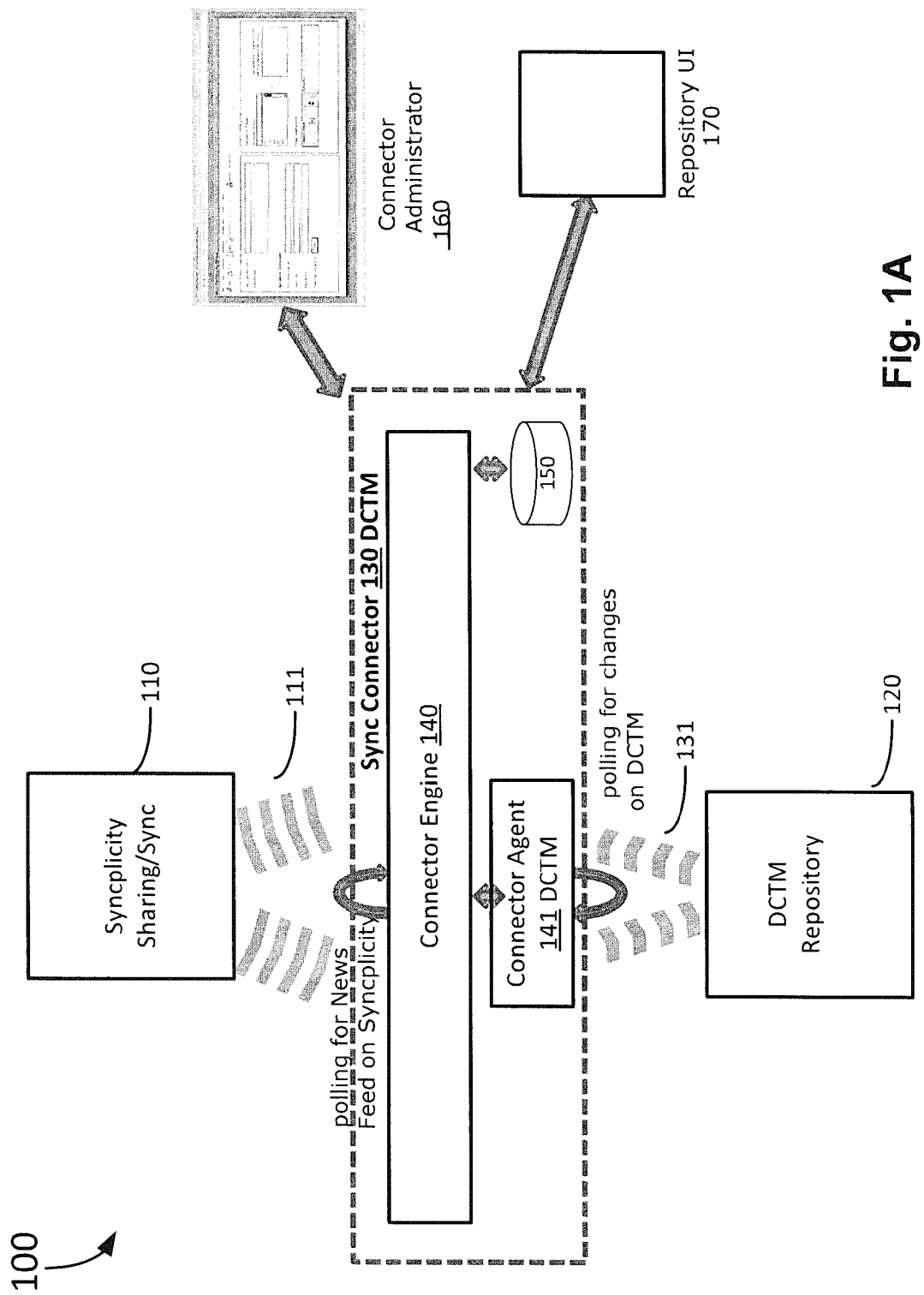
FIG. 1A is block diagram of an integrated system for content sharing and synchronization between a single-user file sharing service and a multi-use content management service.

FIG. 1A illustrates one embodiment of a networked environment 100 that includes a file sharing/synchronization service 110, a document repository 120, and a connector 130. The connector 130 listens for changes to content on either the file sync service 110 or the repository 120, and coordinates downloads to the repository and uploads to the file sync service to provide synchronized content. The connector may be configured through user interface (UI) 160, or in an alternative embodiment, via UI 170. The repository 120 is coupled to the connector 130 via a communications link 131, and the file sharing service 110 is coupled to the connector via communication link 111.

The components shown in FIG. 1A may be implemented with conventional computing devices configured in well known manner, e.g., by providing executable instructions to the computing devices for performing their respective functional operations and for communicating and interacting with each other. For example, the file sharing service 110 is a single user web-based service, such as the Syncplicity service, that allows folders and files to be identified, shared and synchronized among all of the user's computing devices, without moving the files. Likewise, the repository may be a conventional content management service, such as the Documentum content management service. The examples described herein are based on connecting the Documentum repository platform with the Syncplicity service. However, it should be recognized that other platforms can be similarly integrated through suitable instruction programming.

The connector 130 is preferably implemented as an instance of an application server running between the file sharing service 110 and the repository 120. The connector 130 therefore is preferably programmed with executable instructions designed to achieve two main objectives: (i) to publish content from the repository to the file sharing service so that computing devices connected to the file sharing service can share the content; and (ii) to coordinate changes made to content at either the file sharing service or the repository in order to synchronize the contents.

The connector 130 is configured to include a connector engine (CE) 140, which is a generic, platform-independent framework that serves as a bridge between the file sharing service 110 and the repository platform 120. For example, CE 140 is programmed with executable instructions to (i) upload content from the repository to the file sharing service; (ii) store the synchronization status of each uploaded file and folder in a persistent store 150, e.g., Derby or an external database (not shown) configured by users (such as Oracle or SQL Server, via setting a proper JDBC driver, URL and credential); (iii) monitor content changes on the file sharing service, and (iv) download changes from the file sharing service to the repository.

The connector 130 also includes a connector agent 141, which is a platform-specific module used by the CE 140 to communicate with the underlying repository platform 120 regarding traversing folders, retrieving or saving content, monitoring changes, etc. For example, connector agent 141 may be programmed with executable instructions to (i) navigate the folder structure on the repository platform; (ii)

upload content from the repository to the CE 140; (iii) download content from the CE to the repository; and (iv) record the synchronization status of each uploaded file and folder in the repository. The synchronization status may be used by clients to mark or decorate the corresponding object on the user interface.

Figure 1B:
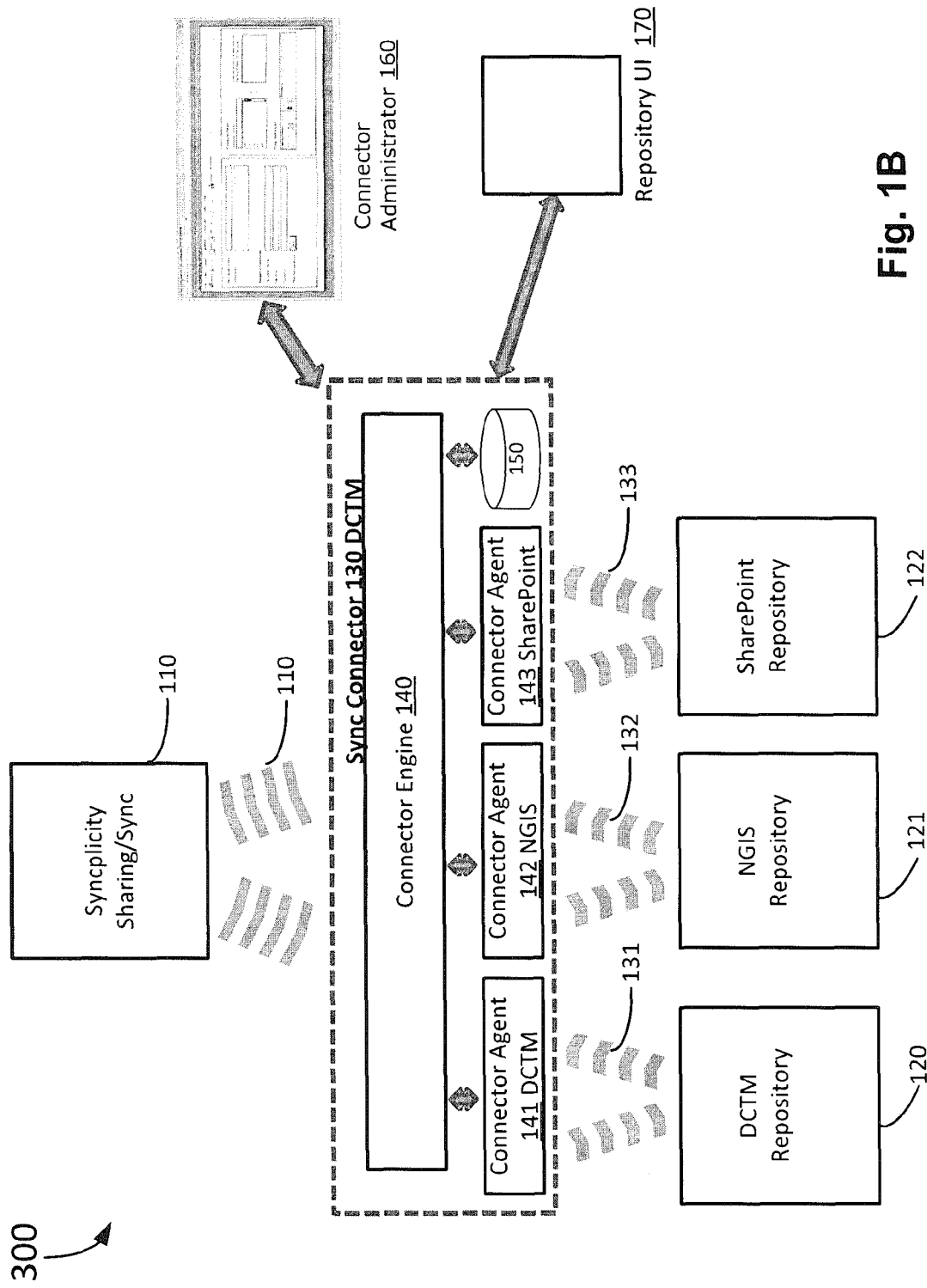
FIG. 1B is block diagram of an alternative embodiment of an integrated system for content sharing and synchronization between a single-user file sharing service and a multi-use content management service.

Another embodiment shown in FIG. 1B is similar to that of FIG. 1A, but in FIG. 1B, CE 140 interacts with a number of different repositories 120, 121, 122, and each repository has a platform-specific connector agent 141, 142, 143, each connector agent configured according to the respective platform. In addition, agent 142 is coupled to repository 121 by communications link 132, and agent 143 is coupled to repository 122 by communications link 132.

The connector 130 is preferably configured through UI 160, which acts as a connector administrator for configuring content sharing between the repository 120 and the file sharing service 110. The UI 160 is configured to allow users, such as a system administrator, to (i) create profiles which define the credential mapping from repository users or groups to a file sharing service login account and filtering rules (based on object type, format, file size, and so on) for deciding what kinds of content to synchronize in and out; (ii) share a folder with an associated profile; and (iii) change the password for a credential in a file sharing service account, repository admin account, etc. Since the UI 160 is mainly driven by administrators based on company policy, operating in this mode is referred to herein as Auto Sharing or Implicit Sharing.

The connector 130 may also be configured through alternative UI 170, which is adapted for a particular repository platform and is suitable to configure the folders for sharing. For example, UI 170 may be a feature of the Documentum platform, e.g., D2 ver. 4.1 and/or xCP ver. 2.0. Such a client UI is driven by end users based on their own needs, and thus, operating in this mode is referred to herein as Manual Sharing or Explicit Sharing.

2. Creating Listeners or Changes

The Documentum platform includes a number of pre-defined Business Process Manager (BPM) activity templates that may be used to represent particular tasks that can be added to a business process, for example, rendering a Word document to PDF format. Custom templates may also be created from scratch or by modifying an existing template. In general, a BPM activity template identifies any underlying workflow methods required to complete the task, and determines what configuration attributes must be set in order to accomplish the task. The BPM activity template may also set default values for common attributes.

Figure 2:
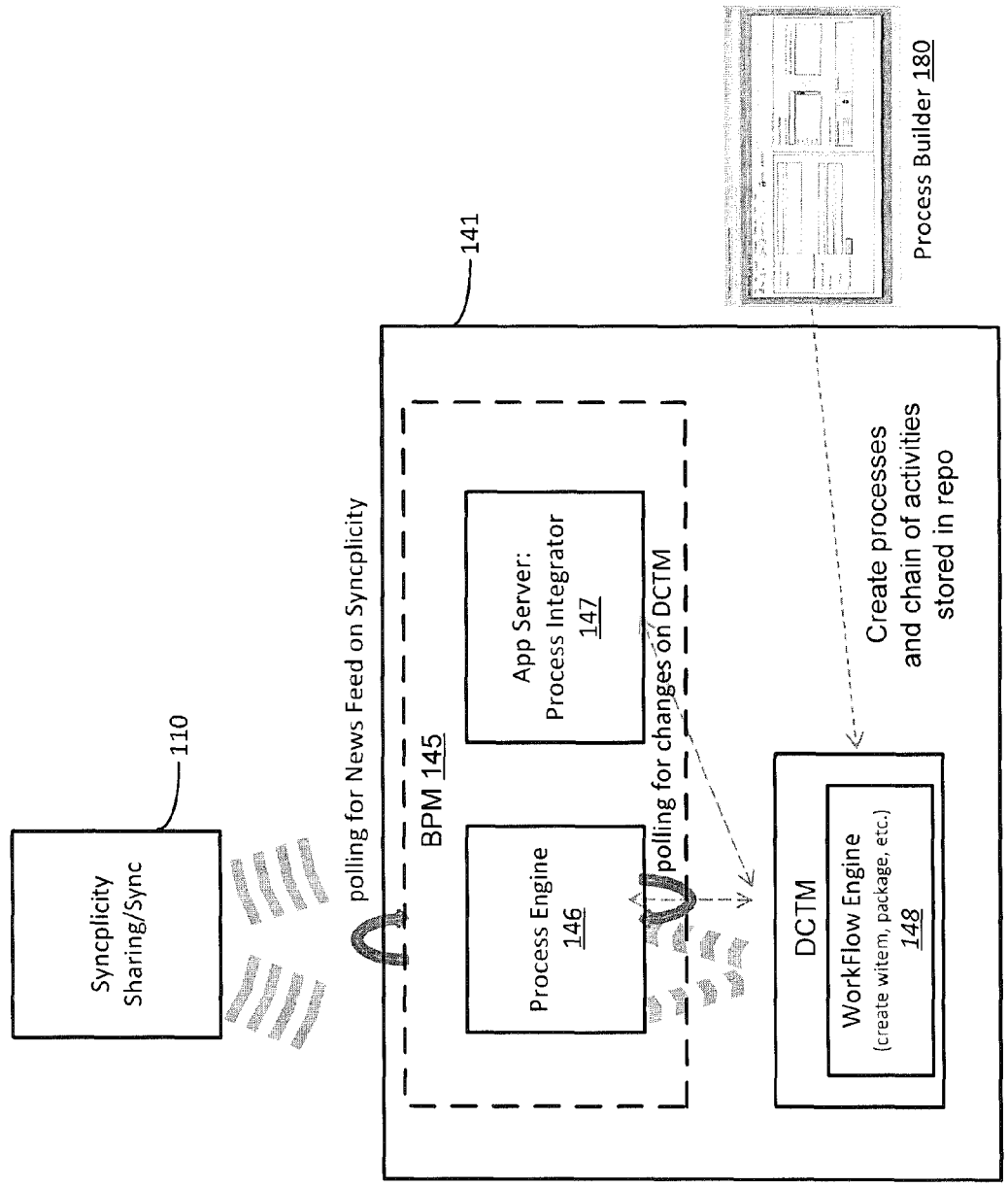
FIG. 2 is a block diagram illustrating functional components of the system of FIG. 1A.

As shown in FIG. 2, the connector agent 141 is configured to include a workflow engine 148 and a BPM module 145. The BPM module 145 is further configured with a process engine 146 and a process integrator 147.

The Process Builder tool 180 of the Documentum platform is used to create and define workflows and processes for publishing and synchronizing folders and files between the file sharing service 110 and the repository 120, and these workflows and processes are stored in the repository via the workflow engine 148. More particularly, the defined processes create listeners, and the process engine 146 executes the processes. Information regarding connection, status and cross-reference for the file sharing service 110 may be hard-coded into the connector engine 141.

3. Publishing Content

Figure 3:
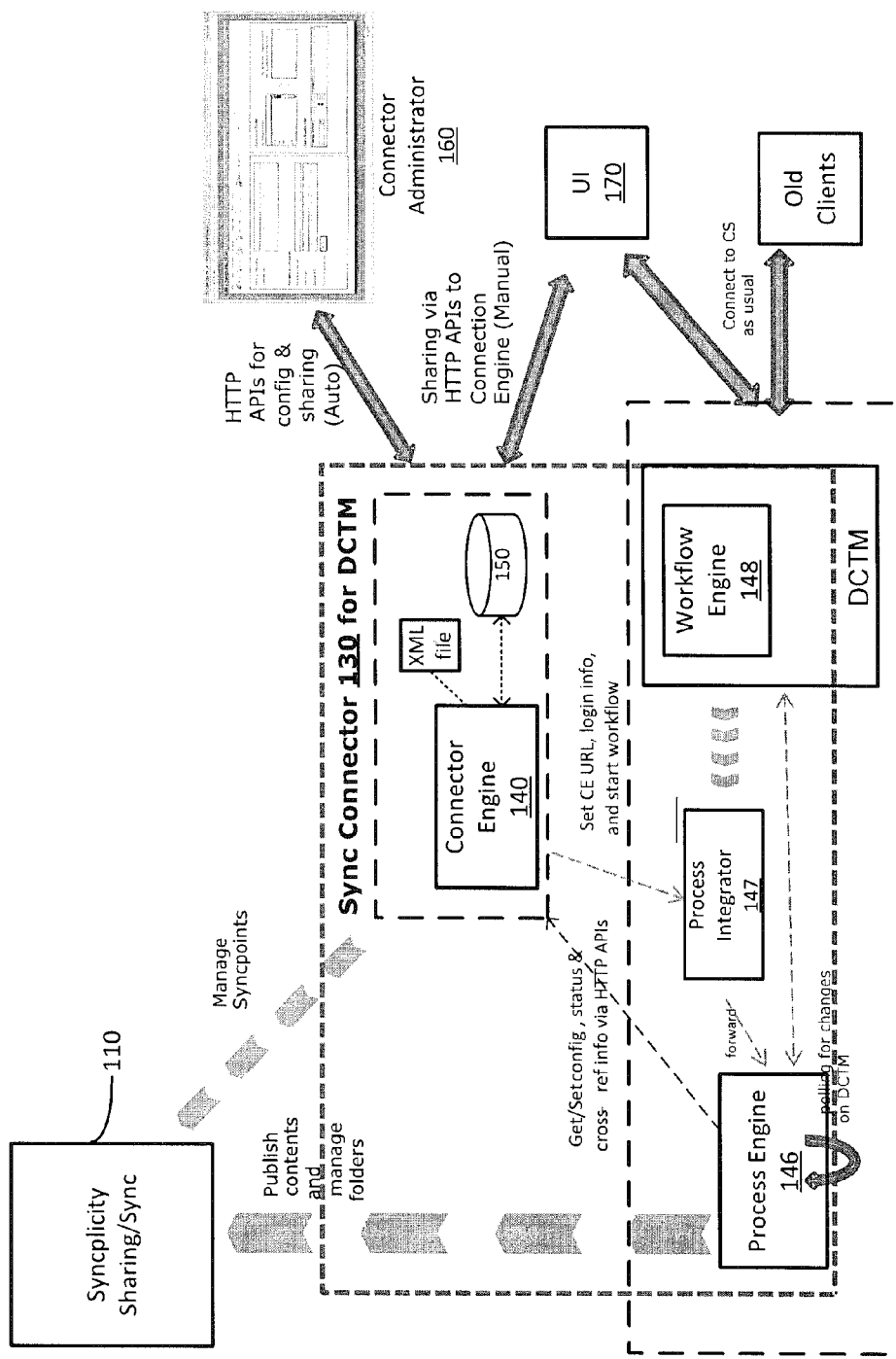
FIG. 3 is a block diagram illustrating functional components of the system of FIG. 1A.

FIG. 3 illustrates one embodiment for the case of publishing content from the repository 120 to the file sync service 110, i.e., single directional synchronization only. An embodiment for bi-directional synchronization is described further below. In this architecture, the connector engine 140 is developed as a web application, packaged as a WAR file, and is running on an application server, such as Tomcat. A default database 150 is separately packaged and deployed as another WAR file. The connector agent 141 leverages the processes of the BPM module (i.e., the process engine 146 and the process integrator 147) to enable communication between the connector engine 140 and the repository 120.

In the Auto Sharing mode, the connector administrator UI 160 has a number of defined application programming interfaces (APIs) using the HTTP protocol for configuring the connector 130 for sharing and synchronization. Alternatively, in the Manual Sharing mode, the repository platform UI 170 has defined APIs for configuring the connector 130, and for interacting with the repository 120.

The process engine 146 obtains configuration information from CE 140, as well as status and cross-reference information. The connector engine 140 then sets a URL for its operation, obtains the user's credentials (through a log-in process), and starts the workflow at the process integrator 147. The process integrator 147 and the workflow engine 148 forward defined processes to the process engine 146, where the processes are executed, causing the process engine to poll for changes in content at the repository 120, then publishing (uploading) changed content to the file sync service 110 and managing the shared folders. The connector engine 140 coordinates and manages sync points with the file sync service 110.

Figure 4:
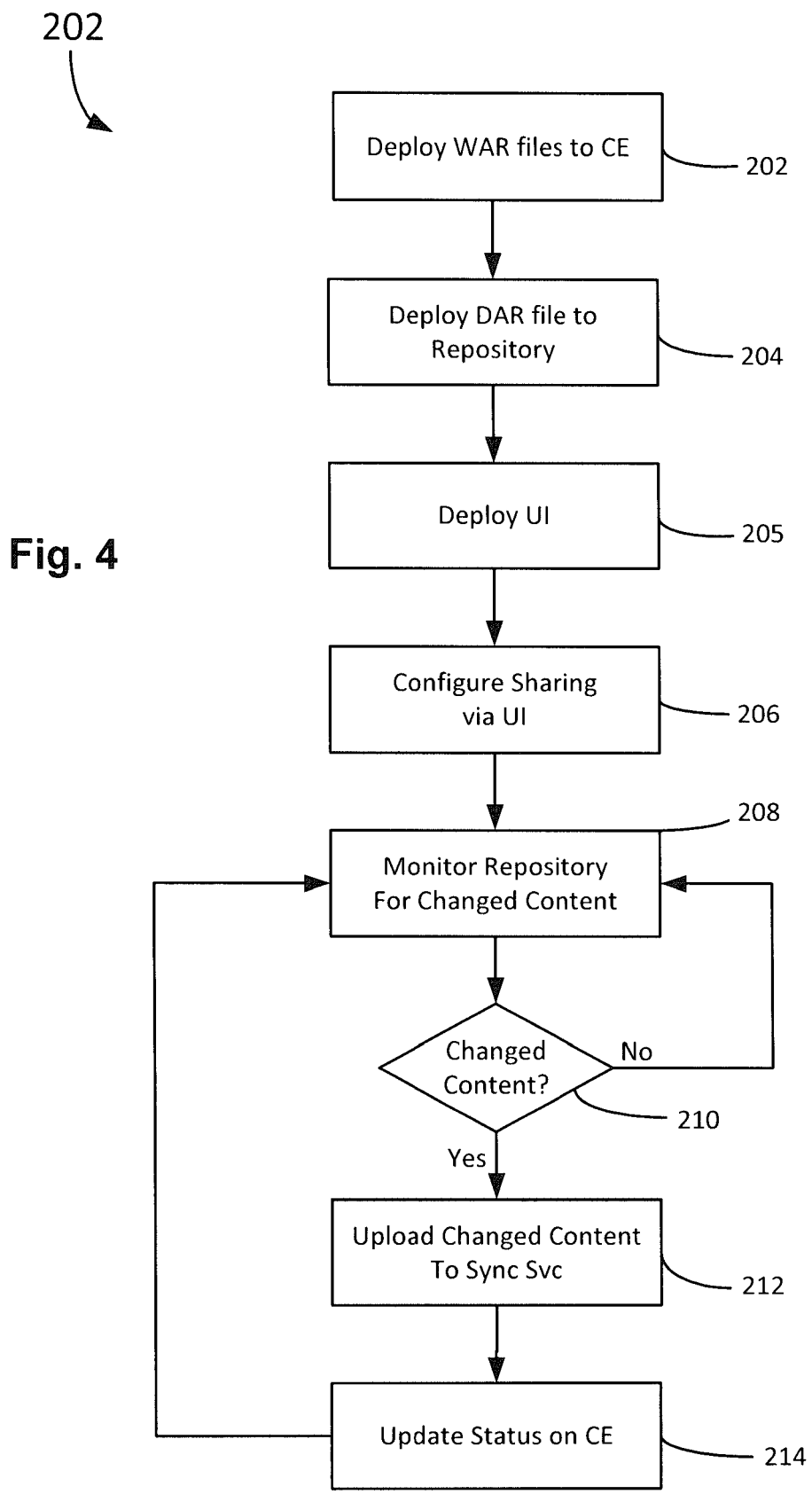
FIG. 4 is a flow chart illustrating a process for installing a synchronization connector.

FIG. 4 illustrates the basic process 200 for installing and running the synchronization connector 130 for the case of publishing content. In step 202, one or more WAR files are deployed to the connector engine 140. The basic WAR file is a Java archive (JAR) file used to distribute a web application, which is a collection of Java server pages, Java servlets, Java classes, XML files, tag libraries, static web pages, and other resources. The WAR file includes an XML file which provides the initial connection and credential information. The default database 150 is packaged as a separate WAR file. The connection and credential information can be changed later through one or more APIs. In step 204, the user/installer deploys a Documentum archive file (DAR) file with the BPM module as described above to the repository 120. In step 205, the user/installer deploys the connector administrator UI 160. In step 206, the user/installer uses the connector administrator UI 160 (or UI 170) to configure sharing folders and files between the file sync service 110 and the repository 120. In step 208, the process engine 146 monitors the repository for any content changes. If changed content is detected in step 210, the process engine 146 uploads the changed content to the file sync service 110 in step 212, then updates the status for the file/folder on connector engine 140 in step 214. The process returns to step 208 to continue monitoring for changed content. If changed content is not detected in step 210, the process also returns to step 208 to continue monitoring for changed content.

Figure 5:
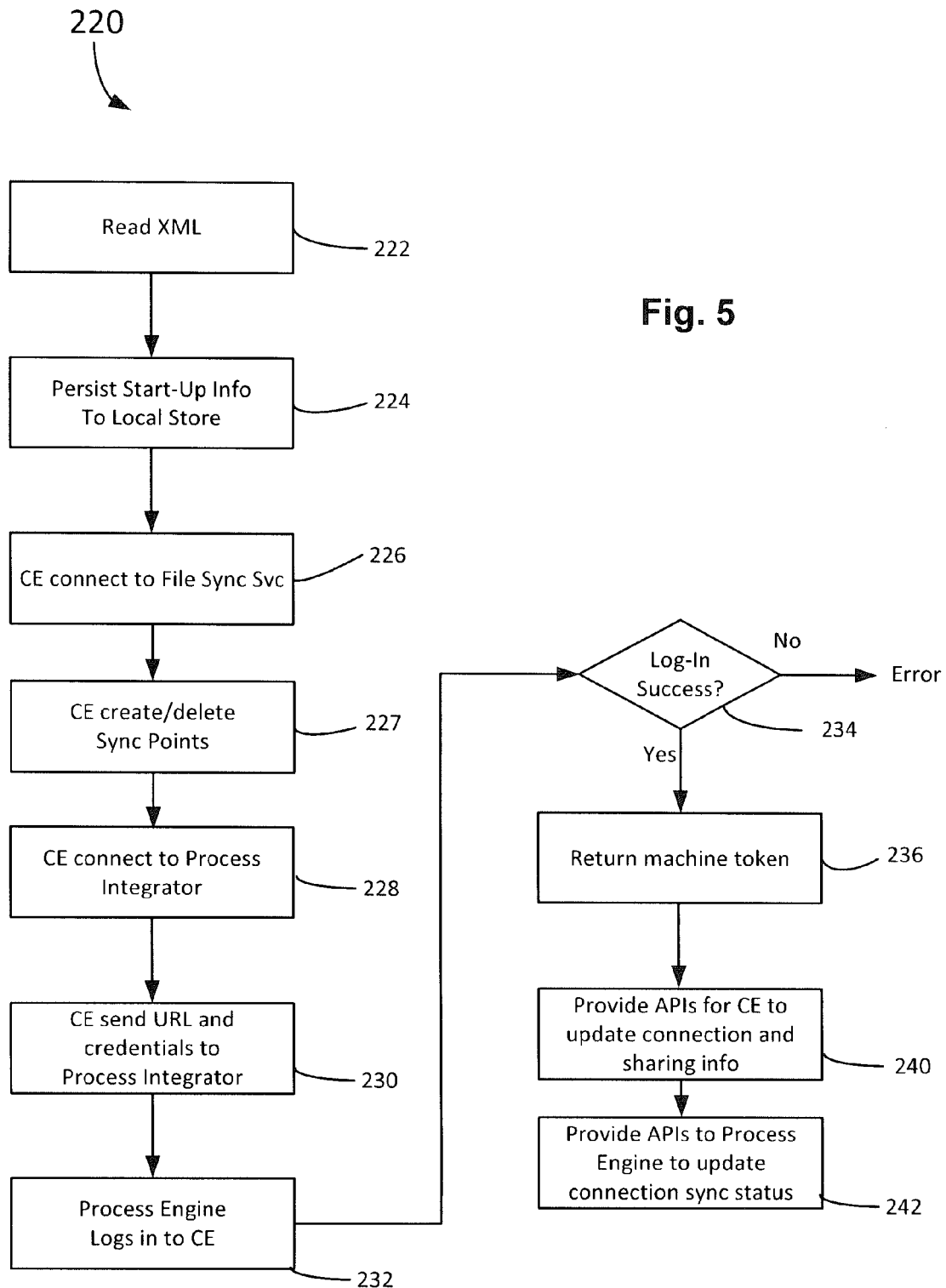
FIG. 5 is a flow chart illustrating a process for starting up and running a synchronization connector.

FIG. 5 illustrates a process 220 carried out by CE 140 to initially start-up and operate the sync connector 130. In step 222, the XML file deployed via the WAR file is read into CE 140, and the start-up and operating information from the XML file is persisted into the local store 150 in step 224. An XML schema may be developed to implement process 220 by one with skill in this art, and such a schema basically has three parts: (i) connection information, i.e., URL and credential, for allowing CE 140 to work with the other components; (ii) configuration information for setting up file sharing between the file sync service 110 and the repository 120, including filtering rules so that only qualified contents will be synchronized; and (iii) APIs for allowing CE 140 and BPM module 145 to communicate with each other, including setting up the synchronization status.

In step 226, CE 140 connects to the file sync service. In step 227, CE 140 creates and/or deletes sync points for the file sync service 110. In step 228, CE 140 connects to the process integrator 147, and in step 230, CE forwards its own URL and credential information to the process integrator.

In step 232, the process engine 146 logs in to CE 140. If the log-in is not successful in step 234, then an error is generated back to the UI 160. If the log-in is successful, then the file sync service 110 returns an authentication token back to the process engine in step 236. In step 240, APIs are provided through UI 160 (or UI 170) to permit updating the connection and sharing information stored in CE 140 (or more accurately, in the local store 150). In step 242, APIs are provided through UI 160 (or UI 170) to allow the process engine 146 to update the synchronization status.

During the installation process, a DAR file is installed to the repository 120 to create objects and types in the repository. For example, an object dm_relation_type is created with the object types shown in FIG. 6A, and object subtypes dm_relation to dm_relation_sync_status is created with the attributes shown in FIG. 6B.

4. Connection Dependencies Among the Components

Figure 7:
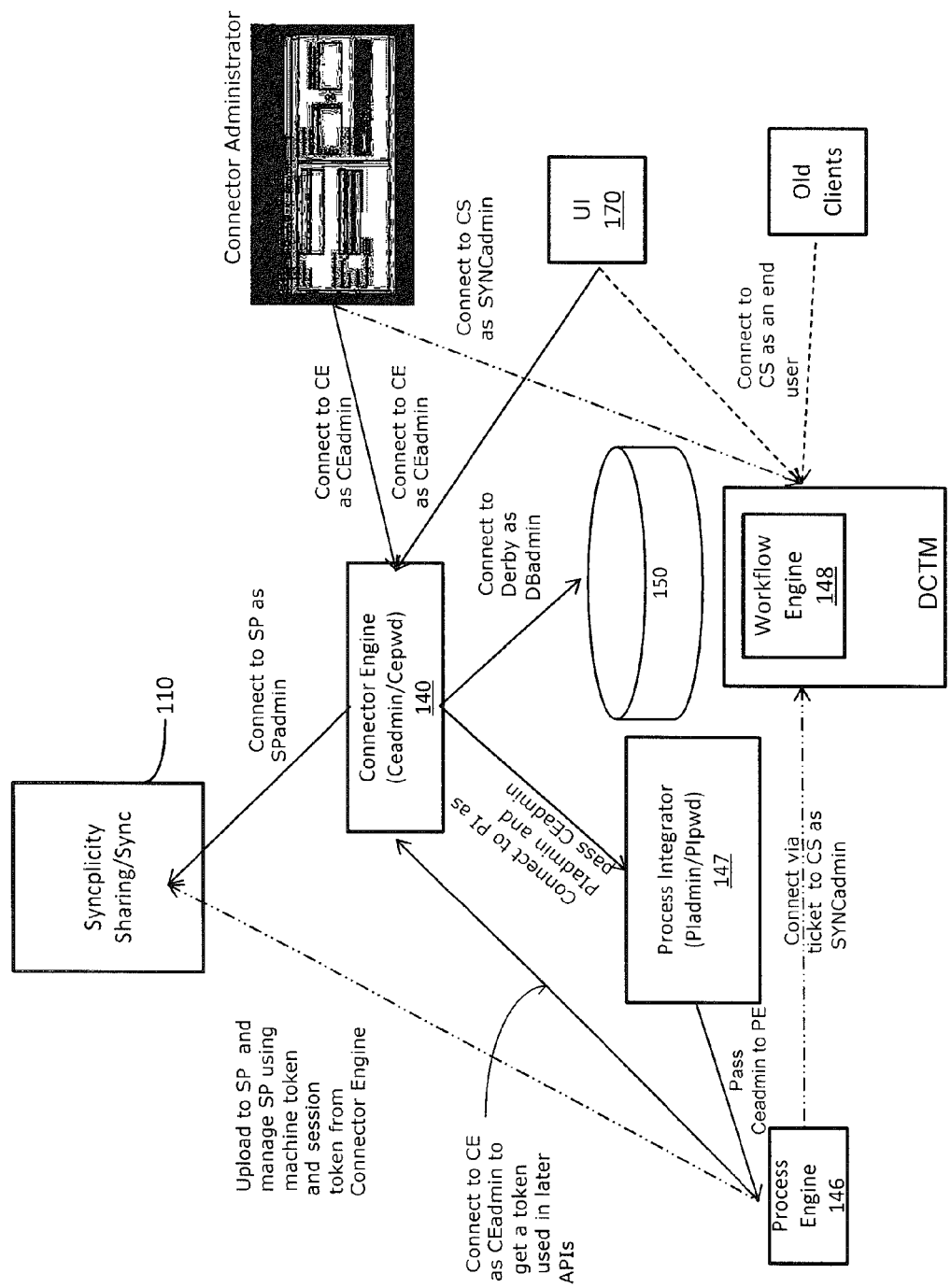
FIG. 7 is a block diagram illustrating connection dependencies among the components shown in FIG. 1A.

FIG. 7 illustrates the connection dependencies among the various components described herein. For one-way synchronization, CE 140 needs to talk to the file sync service 110 in order to create syncpoints as well as get an authentication token to pass to the process engine 146. The process engine 146 uses the authentication token to upload folders and files, and to get synchronization status from the file sharing service 110. For two-way synchronization, CE 140 will be configured to handle the tasks from the process engine 146. For one-way synchronization, the process engine 146 needs to retrieve and update the uploaded file name, synchronization status and action from CE 140. For two-way synchronization, PE 140 will pass contents between CE 140 and repository 120. Further, the connector administrator UI 160 (or D2/xCP UI 170) needs to talk to CE 140 to configure the sharing information. CE 140 needs to pass its connection and credential information to process integrator 147. Finally, the process integrator 147 needs to pass along the connection and credential information from CE 140.

Figure 8:
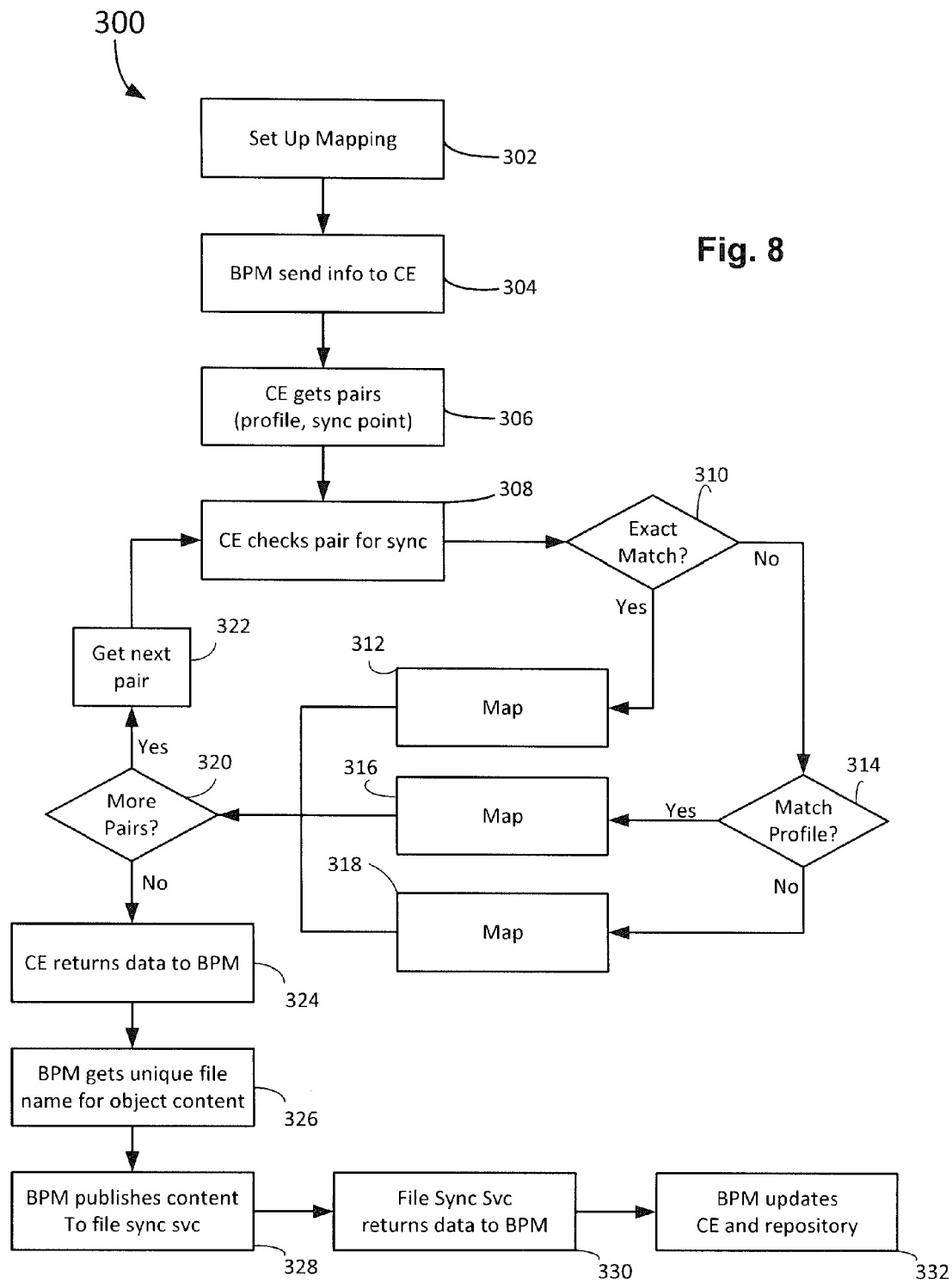
FIG. 8 is a flow chart illustrating a process for mapping sharing and synchronization between the components shown in FIG. 1A.

FIG. 8 illustrates a process 300 carried out between CE 140 and the BPM module 145. In step 302, the user, via the connector admin UI 160, sets up the mappings from a profile or user/group name to a token, and from a profile or folder ID to a sync point or vpath in CE 140. In step 304, the BPM module 145 sends information to CE 140, including the user name, shared folder ID, relative path, object ID and content ID, and repository version ID. For objects that are linked in two different shared folders, two requests must be generated.

In step 306, CE 140 uses the folder path to retrieve all pairs of profiles and sync points. Steps 308-312 will be repeated for each pair. In step 308, CE 140 checks to see if the content at the sync point is synchronized by using the sync point, object ID and content ID, folder path, and repository version ID. If the content is synchronized, e.g., the content is an exact match in step 310, then in step 312, CE 140 maps the (profile, username) to a token, and maps the (profile, folder_path) to the (sync point, vpath). If there is not an exact match in step 310, but the profile matches in step 314, then in step 316, CE 140 maps the (profile, user_name) to a token, and maps the (profile, folder_path) to (sync_point, sync_point root/ folder_path). If there is no exact match and no profile match, then in step 318, CE 140 maps the (profile, user_name) to a token, and maps the (profile, folder_path) to (def_sync_point, sync_point_root/folder_path).

If there are more pairs to consider in step 320, then in step 322 the CE 140 retrieves the next pair, and the process returns to step 308 to process the next pair. If there are no more pairs to consider in step 320, then in step 324, CE 140 returns a data set to the BPM module 145 having <token>, <sync point>, <sync or not>, and <sync create vpath or not>.

In step 326, the BPM module 145 gets a unique file name for the content of the object, and in step 328 uses <token>, <sync point>, <vpath> to publish the content to the file sync service 110. In step 330, in response to publishing the content, the file sync service 110 returns to CE 140 a unique file ID, the sync version ID, and the date modified. Finally, in step 332, the BPM module 145 uses the object ID, folder path, unique file name, unique file ID, sync version ID, and date modified, to update the sync status on CE 140 and repository 120.

5. BPM Processes

BPM processes are defined through Documentum activity templates to facilitate publishing content to the file sync service 110. Examples of the process templates are illustrated in FIGS. 9-21.

Figure 9:
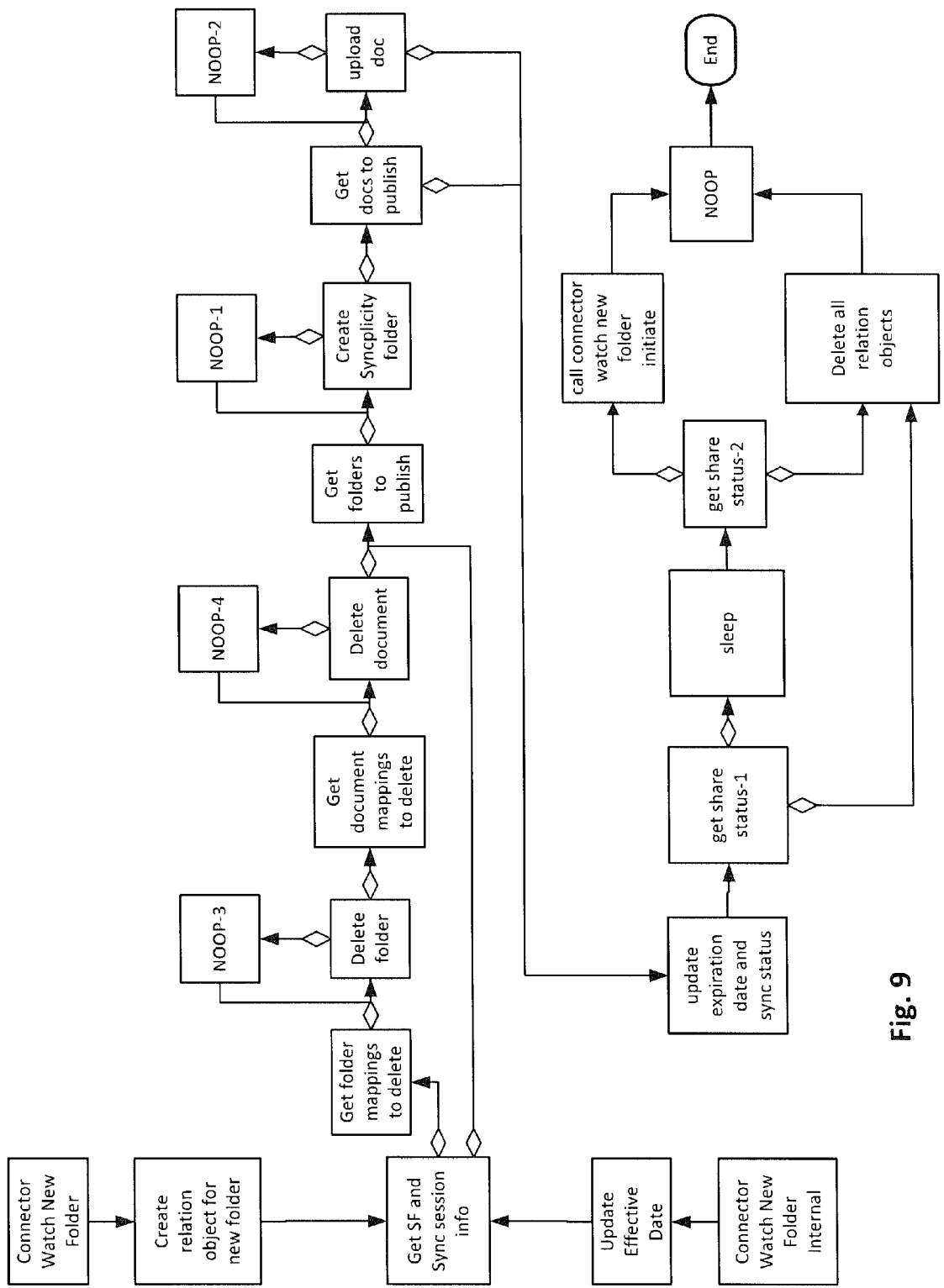
FIGS. 9-21 are flow diagrams illustrating the processes implemented in the components shown in FIG. 1A.

The process template Connector Watch Documentum Folders, illustrated in FIG. 9, is the main process for publishing content to the file sync service 110. The process is initiated by a request from CE 140, and will run until folder monitoring is stopped, or the share is removed from the database. This process template gets share, profile and user credentials for the file sync service 110 from CE 140, synchronizes contents from the repository 120 to the file sync service, creates or updates the dmc_relation_sync_status object for decorators, and then goes to sleep. The process resumes after a sleep interval and starts synchronizing the contents again. The sleep interval or frequency is set in the configuration of the folder share.

This process is a long running process, so in order to avoid overpopulating the workitem table in the local store, a new process is initiated for each publishing cycle. The activity Connector Watch New Folder is used only for external requests. i.e., a call from CE 140, while the activity Connector Watch New Folder Internal is used only for internal requests.

Figure 10:
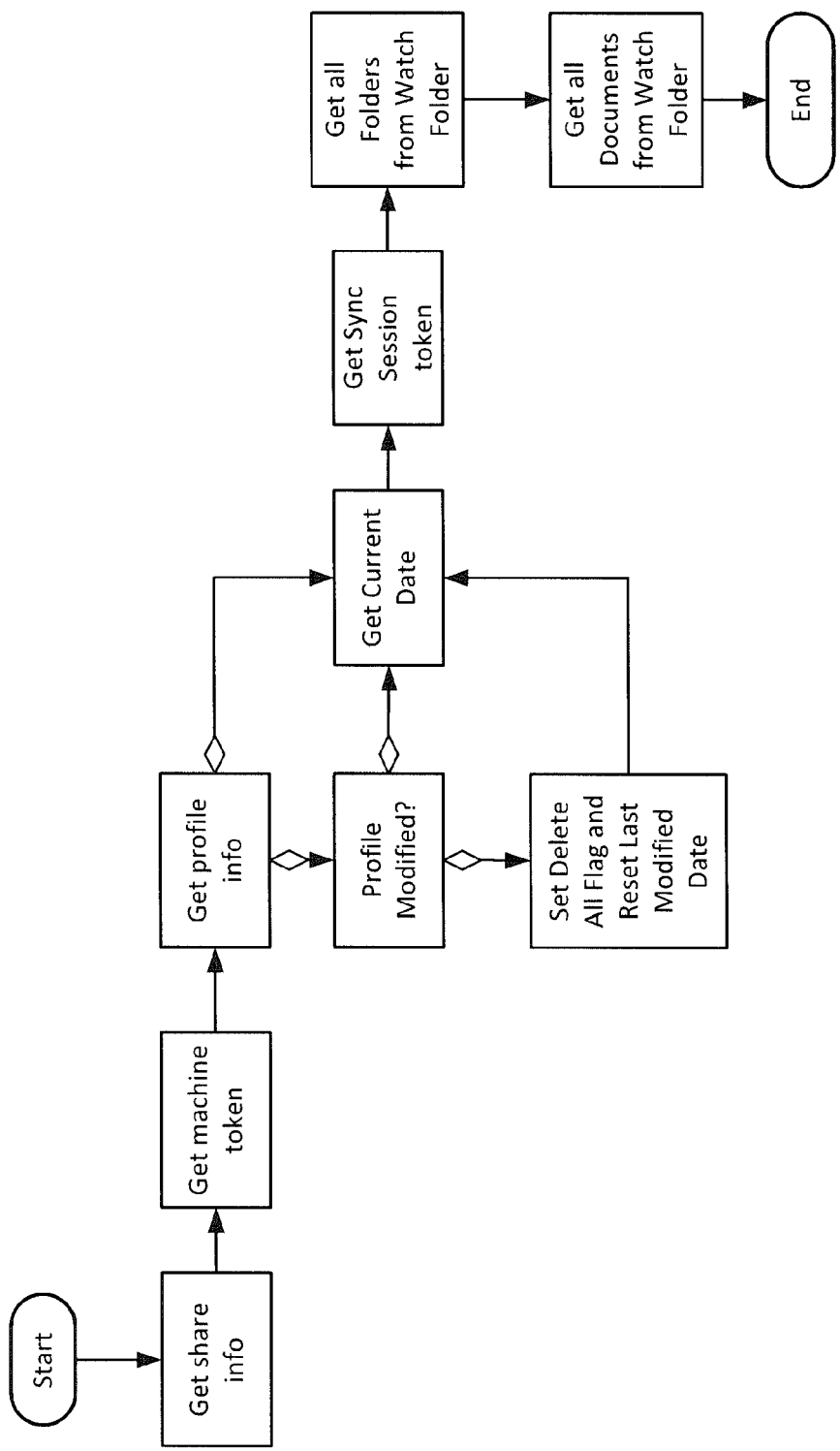

The process template Connector Get CF and Syncplicity Session Info, illustrated in FIG. 10, gets authentication token, share and profile information from CE 140. The process then obtains a session token using the authentication token/application token from the file sync service 110. This session token is used to authenticate future requests to the file sync service 110. The process includes the ability to retrieve information for folders and files present in the watch folder from repository 120. The process also checks to see if the profile has been versioned. If the profile is versioned between two requests, then content already synchronized is removed from the file sync service 110 and CE 140, and a synchronization cycle is run again.

Figure 11:
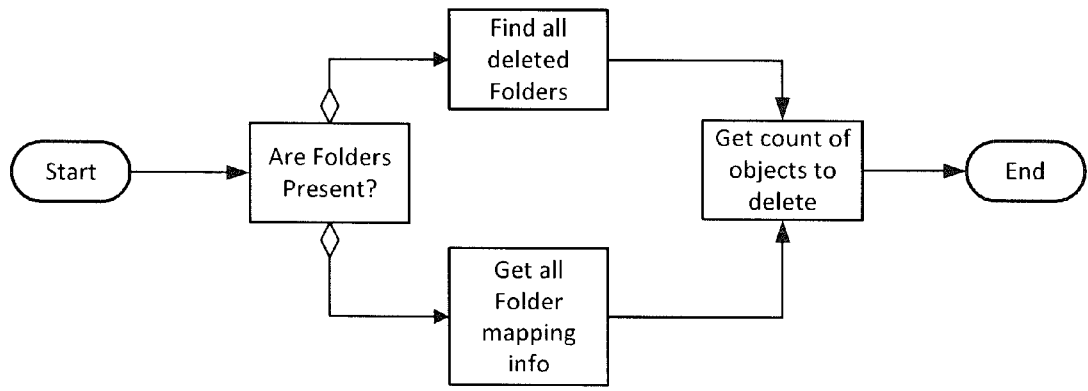

The process template Connector Folder Mappings To Delete, illustrated in FIG. 11, finds the folders that are deleted/unlinked from the watch folder by calling the folder orphaned mapping API.

Figure 12:
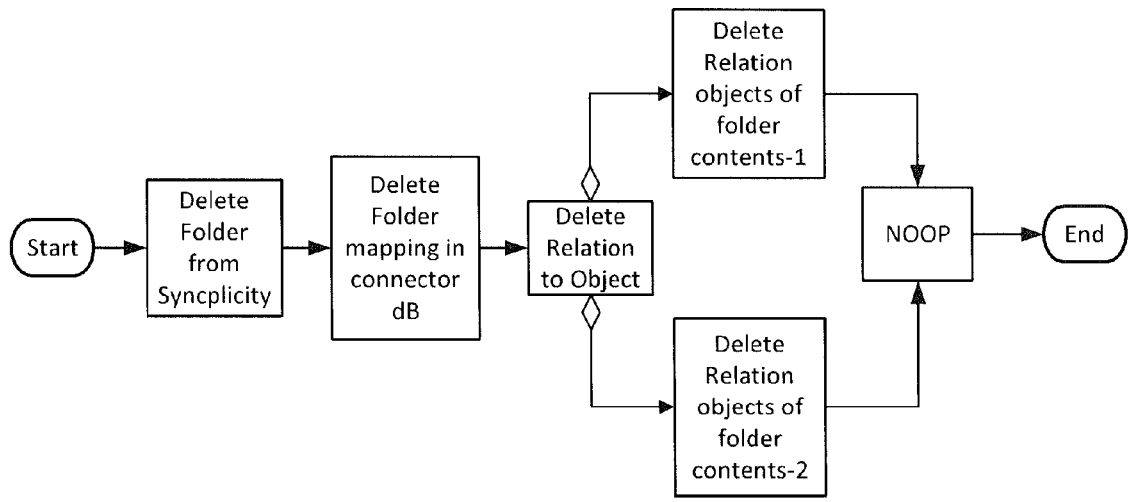

The process template Connector Delete Syncplicity Folder, illustrated in FIG. 12, deletes the folder and its contents from the file sync service 110 and the connector database 150, as well as deleting the relation object for the folder and its contents.

Figure 13:
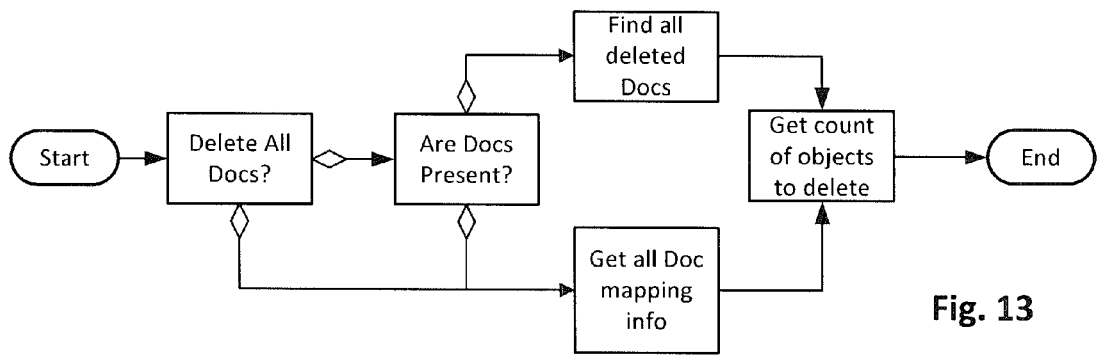

The process template Connector Get Document Mappings To Delete, illustrated in FIG. 13, finds the files that are deleted/unlinked from the watch folder by calling the file orphaned mapping API.

Figure 14:
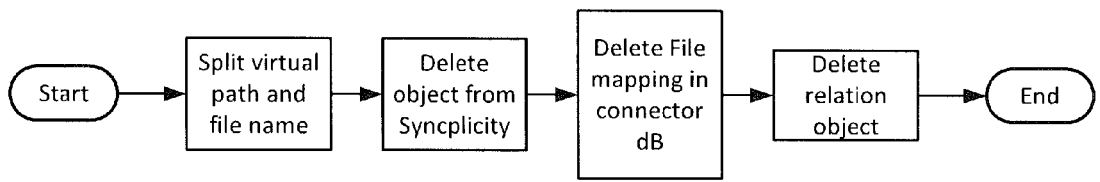

The process template Connector Delete Syncplicity Document, illustrated in FIG. 14, deletes the document from the file sync service 110 and connector database 150, as well as deleting the relation object for the document.

Figure 15:
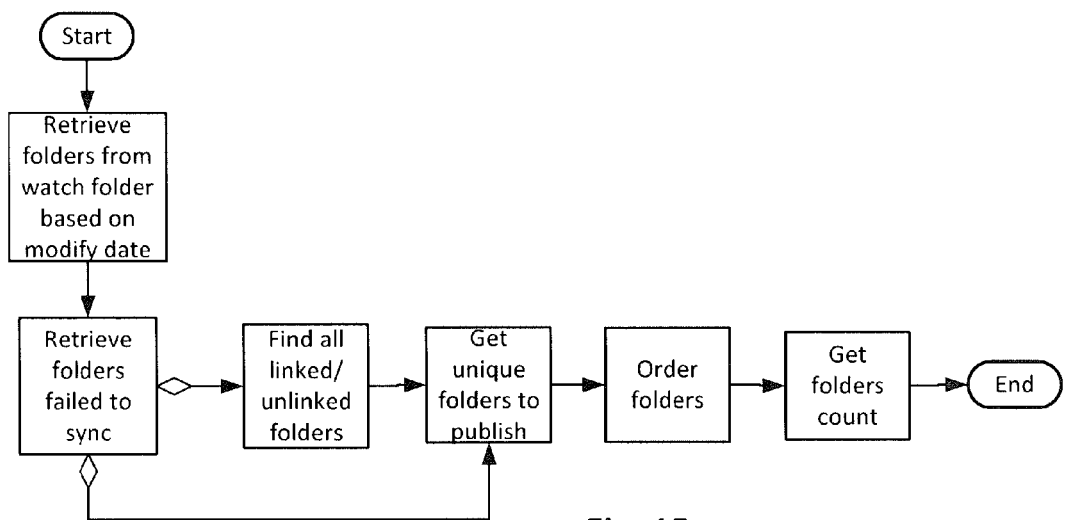

The process template Connector Get Folders to Publish, illustrated in FIG. 15, finds the list of folders that should be published in the current publishing cycle. The list is a collection of three different lists: (i) folders that are linked/unlinked to the watch folder; these folders are identified by the folder orphaned mapping API; (ii) newly created or renamed folders; and (iii) folders that failed to publish in a previous publishing cycle.

The three lists are combined, with duplicate entries removed, and then ordered to make sure that the items are created in the file sync service 110 in the same order as they show up in the repository 120.

Figure 16:
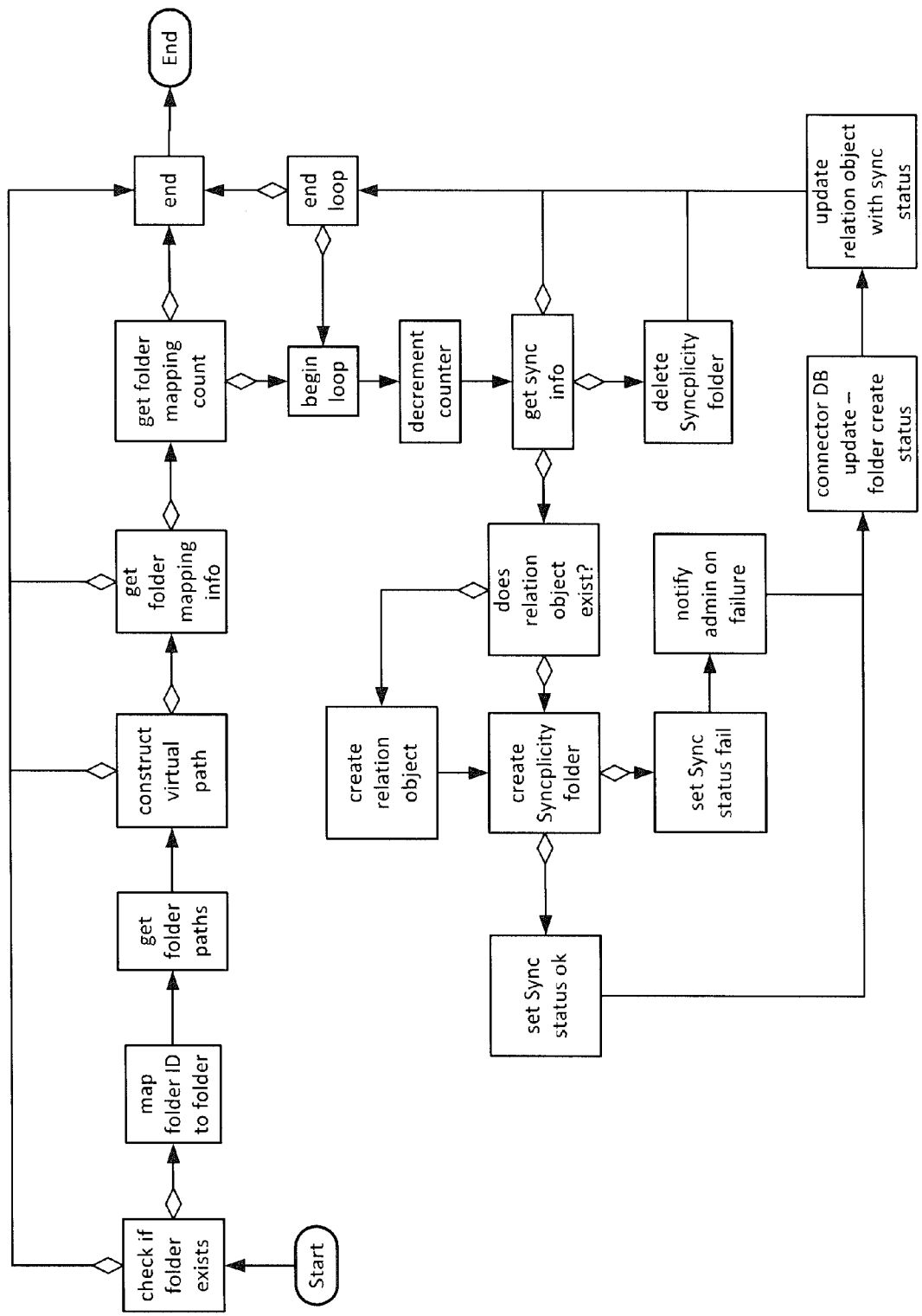

The process template Connector Create Folder, illustrated in FIG. 16, creates a folder in the file sync service 110, an entry in the connector database 150, and a relation object in the repository 120. The folder information is sent to the create folder API in CE 140, and the result is the mapping information which is used to create the folders. There can be more than one mapping for a folder if the folder is linked to multiple folders under the watch folder.

If there is any error during a publish cycle, the status in the connector database 150 and the relation object is set to "sync failed," and a notification is sent to the object dmc_sync_admin with the cause of the error.

Figure 17:
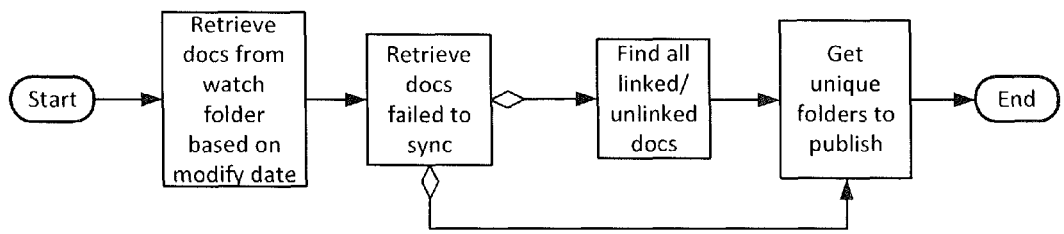

The process template Connector Get Documents to Publish, illustrated in FIG. 17, finds the list of documents that should be published in the current publishing cycle. The list is collection of three different lists: (i) documents linked/unlinked to the watch folder; this information is obtained from file orphaned mapping API; (ii) newly created or renamed files; and (iii) files that failed to publish in a previous publishing cycle. The three lists are combined, with duplicate entries removed, to generate the final list of objects to publish.

Figure 18:
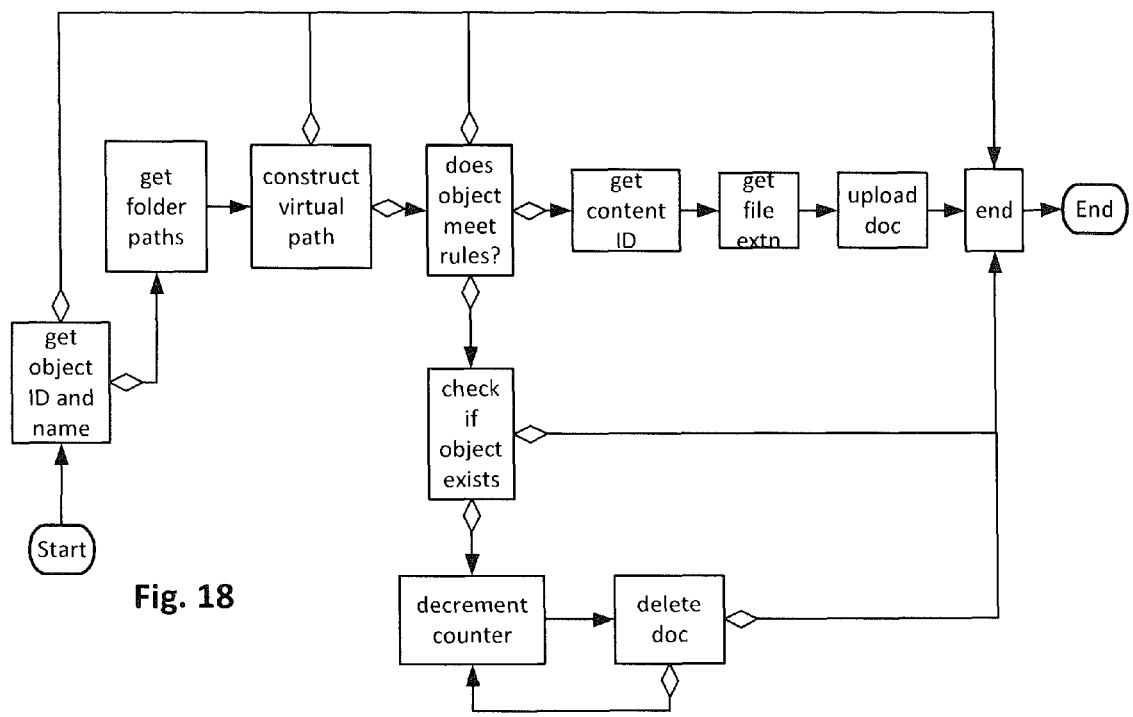

The process template Connector Upload document—filtering rules, illustrated in FIG. 18, checks to see if the file meets the profile rules, and if so, publishes the file to the file sync service 110. If the file does not meet the profile rules, and it was already published in the previous publishing cycle, then the file is deleted from the file sync service 110.

Figure 19:
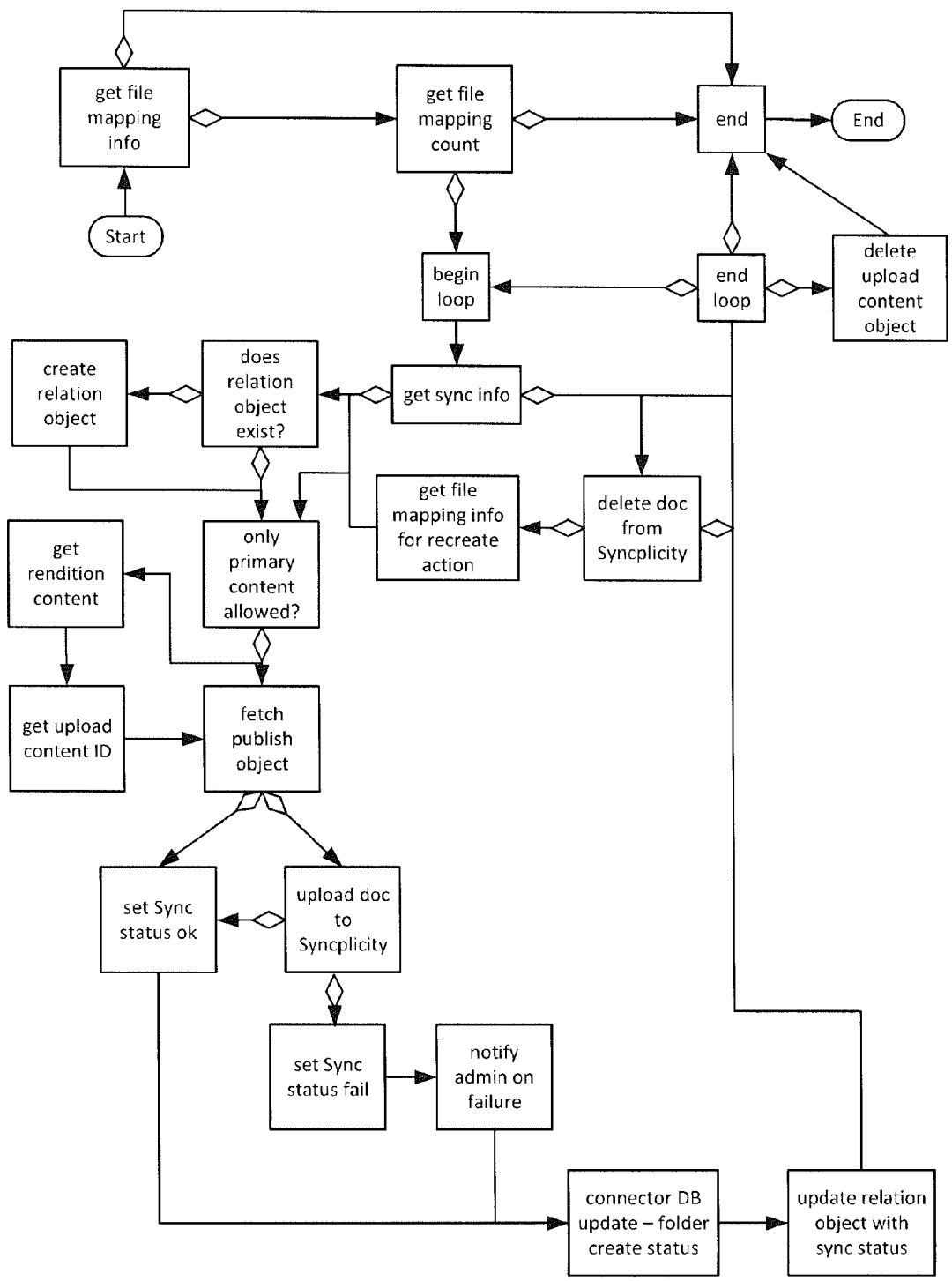

The process template Connector Upload document, illustrated in FIG. 19, creates a file in the file sync service 110, an entry in the connector database 150, and a relation object in the repository 120. The file information is sent to the CE create file API, and the result is mapping information which is used to create files. There can be more than one mapping for a file if the file is linked to multiple folders under the watch folder. If there is any error during a publish cycle, the status in the connector database 150 and the relation object is set to "sync failed," and a notification is sent to the object dmc_sync_admin with the cause of the error.

Figure 20:
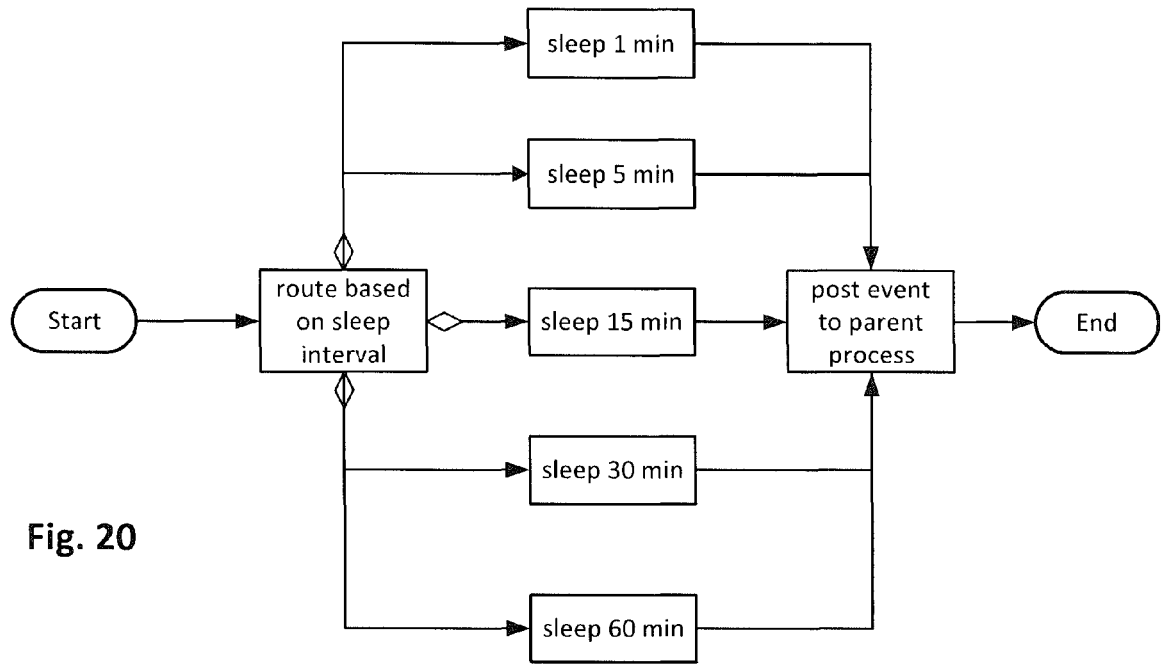

The process template Connector Sync Sleep, illustrated in FIG. 20, enables the process to sleep for the specified time interval and is implemented using post timers. In one embodiment, the sleep time can be set to 1, 5, 15, 30 or 60 minutes. Any values other than the specified values will default to 1 minute. The object dm_WfmsTimerjob should be in an active state and the frequency should be set to 1 minute.

Figure 21:
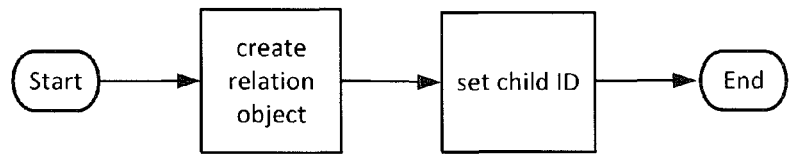

The process template Connector Create Relation Object, illustrated in FIG. 21, creates the object dmc_relation_sync_status and sets the child_id to the relation object id.

6. Connector Engine (CE)

In one embodiment, CE 140 is built on top of the Spring Framework, which is an open source framework for a Java-based platform. Table I below shows the high-level descriptions of Java classes and packages implemented inside CE 140. All the classes are within the com.emc.syncplicity hierarchy.

TABLE I

| Package | Description |
| --- | --- |
| com.emc.syncplicity.connector.controller | Responsible for mapping service URIs to service implementations |
| com.emc.syncplicity.connector.core | Connector core |
| com.emc.syncplicity.connector.database.* | Layer and functionality for interacting with the database |
| com.emc.syncplicity.connector.documenturn.* | Documentum repository specific code |
| com.emc.syncplicity.connector.model | Model for connector whose files are generated using JAXB from the syncAgent.xsd schema file |
| com.emc.syncplicity.connector.service.* | Connector services |
| com.emc.syncplicity.connector.util.* | Utility classes |
| com.emc.syncplicity.httpclient.* | Convenience wrapper classes for making calls into the Syncplicity REST API. Largely borrowed from the Syncplicity Android client code |

The class com.emc.Syncplicity.SyncAgentAppListener implements Spring's ApplicationListener interface and is informed when the web application is started. In the handler, the initial connection to the Derby database is established. If the database does not exist, it is created and the appropriate database tables are also created.

The SyncAgentAppListener calls into the com.emc.syncplicity.connector.core.ConnectorContext implementation with the application context. When the ConnectorContextImpl class which implements the ConnectorContext interface receives the application context, the syncagent.xml file is retrieved from the classpath. The ConnectorContextImpl class then chooses whether to use the configuration based upon the syncagent.xml file or the existing configuration from the database, depending on which is valid and has a higher version number. If the syncagent.xml configuration is selected, shares (syncpoints) and profiles will get created, updated or deleted depending upon whether there are additions, changes or deletions of share and profile elements from the configuration file. Handling of shares and profiles are done through implementations of the com.emc.syncplicity.connector.service.ShareService and com.emc.syncplicity.connector.service.ProfileService interfaces respectively.

The connector engine utilizes the Synplicity REST APIs in order to create and delete syncpoints, to add and remove participants, to get a list of syncpoint participants, and to register a machine to get an authentication token. These API calls go through a set of wrapper classes. The key class that supports all the APIs is com.emc.syncplicity.httpclient.webapi.WebApiManager. A method of that class (executeRequest) handles Syncplicity session token authentication in a manner transparent to the call.

The Syncplicity REST APIs are utilized by the com.emc.syncplicity.connector.service.ShareService interface implementation, namely com.emc.syncplicity.connector.service.impl.ShareServiceImpl class, in response to calls from com.emc.syncplicity.connector.controller.ShareController (web API requests) and the ConnectorContext implementation (xml application initialization).

When a share is created, the connector engine will make a call into the configured com.emc.syncplicity.connector.core.ISyncpointCreatedListener implementation. The interface consists of a single method, as shown below:
  public interface ISyncpointCreatedListener
    {public void onSyncpointCreated(ConnectorContext context, String repository, Share share);}

For the Documentum connector release, the implementation corresponds to the com.emc.syncplicity.connector.documentum.DocumentumSyncpointCreatedListener class. In the onSyncpointCreated method of DocumentumSyncpointCreatedListener, the RestTemplate is used to make a call into ConnectorWatchNewFolder API exposed by the Process Integrator.

The process engine utilizes REST services provided by the connector engine in order to find out information about the share that will be monitored, to find out the filtering rules applicable to a share, to determine whether a document needs to be uploaded to Syncplicity, to record synchronization state, and to determine files or folders which need to be removed from Syncplicity.

7. Collaboration Case

The collaboration use case involves bi-directional synchronization. That is, the collaboration use case supports the publishing use case plus synchronization changes that occur on other endpoints, such as other computers and mobile devices that are linked to the file service 110. In this embodiment, more of the features for synchronizing contents will reside in the connector engine. To that end, the BPM module is replaced with an internal module, and the connector engine implements various queues and threads for different stages of processing content.

Figure 22:
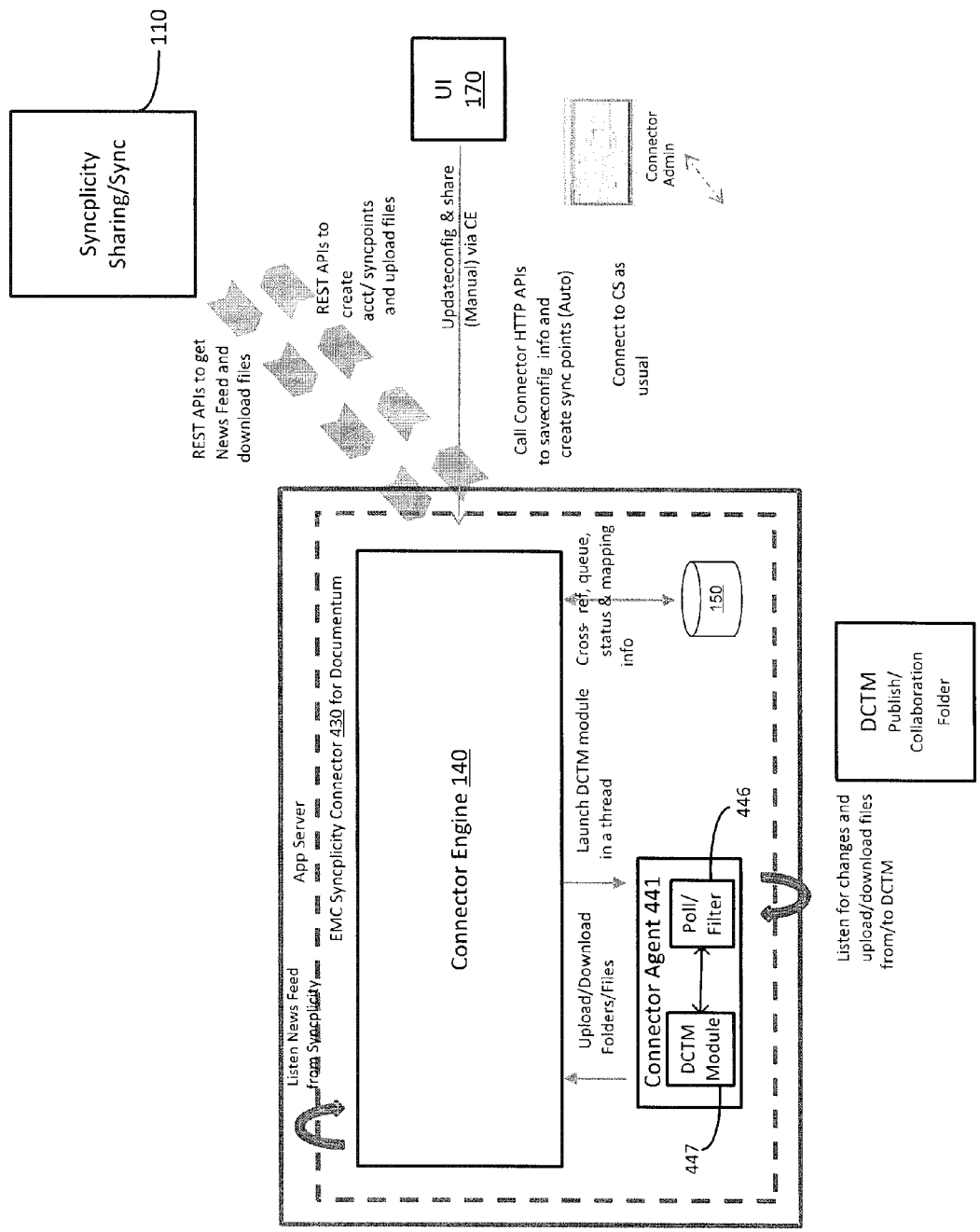
FIG. 22 is a block diagram illustrating an alternative embodiment of an integrated system for content sharing and synchronization between a single-user file sharing service and a multi-use content management service.

FIG. 22 illustrates the high-level architecture for downloading changes from Syncplicity to DCTM. The connector 430 is similar to connector 130 in FIGS. 1A and 1B, but the connector agent 441 now includes a polling and filtering module 446 and repository module 447 that replace the BPM module 145. In addition, the connector engine 440 includes a plurality of queues and threads for parallel processing changes content, as shown in more detail in FIG. 23.

Figure 23:
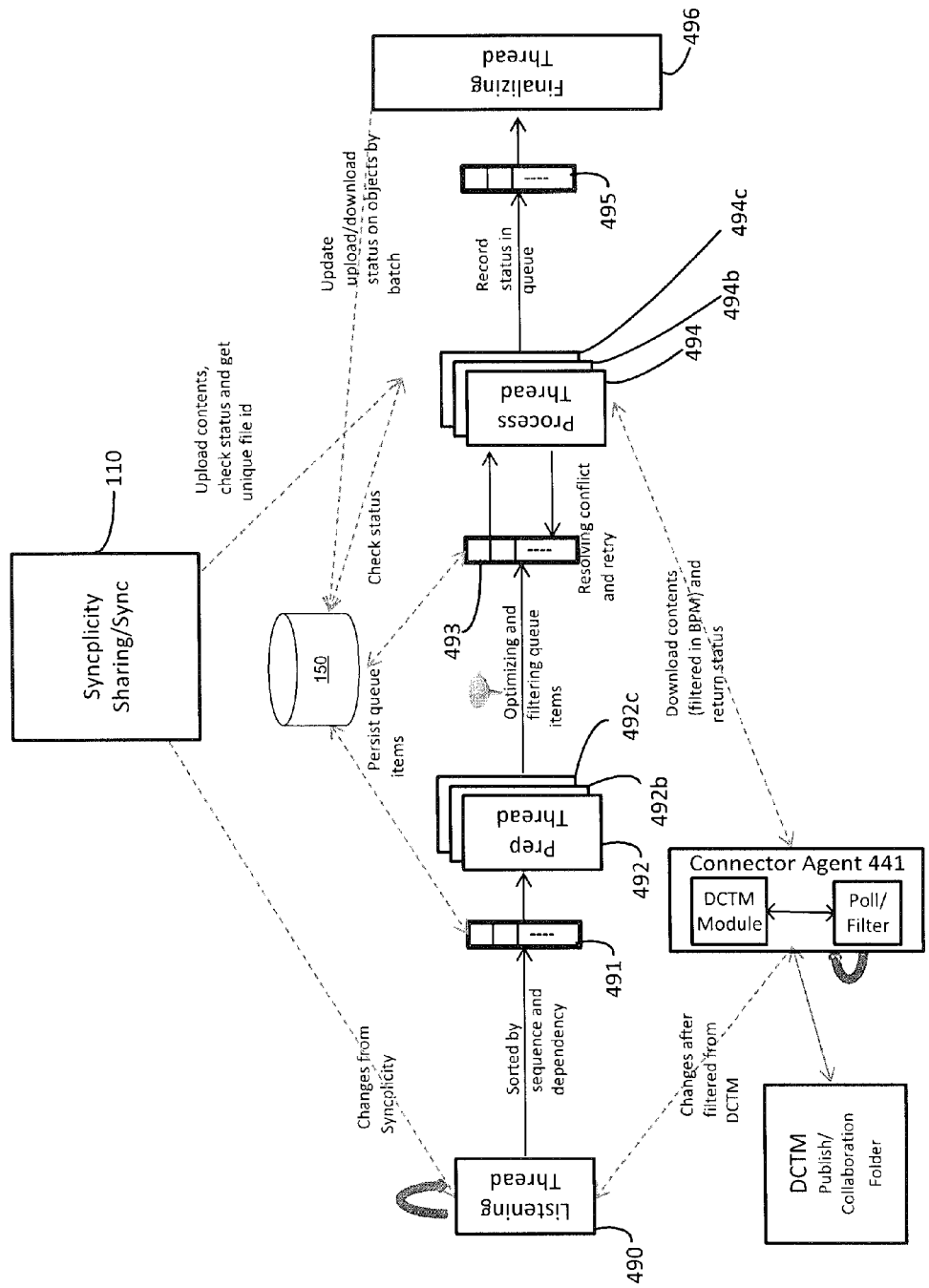
FIG. 23 is a block diagram illustrating the connector engine component of FIG. 22 implemented as a plurality of threads and queues.

FIG. 23 illustrates one embodiment of the connector engine 440 in more detail. As before, the connector engine 440 is deployed via an appropriate WAR file. More particularly, the connector engine 440 is configured with a number of queues and threads to handle various processing tasks in parallel. For example, a listening thread 490 is provided that directly monitors the file sync service for changes to content. Likewise, the listening thread 490 monitors the repository through connector agent 441 for changes to content from the repository side. Any change events are then sorted by chronicle sequence, and a set of dependency trees are created to represent the change events and the trees are placed into a preparation queue 491. The preparation queue 491 uses the local store 150 as a persistent store for storing overflow and crash recovery.

The change events stored in the preparation queue 491 are sent for further processing to a preparation thread 492. The preparation thread 492 takes items from the preparation queue to optimize and filter them based on the nature of the event. Because the change events are stored as a set of trees based on their dependencies, multiple instances of the preparation thread, e.g., threads 492, 492a, 492b, can be run in parallel to simplify the process. The results will be pushed to a process queue 493, where local store 150 is again used as a persistent store.

A process thread 494 is also configured with multiple instances, e.g., threads 494, 494a, and 494b, for parallel processing of the data from process queue 493. The process thread 494 uploads and downloads content as requested, as well as checks the upload synchronization status and stores the status in a finalizing queue 495. Status recorded in the repository is recorded at the time the content is downloaded. The process thread 494 also resolves any conflicts among different versions of change events, typically through defined rules, and may reorder the data in the process queue 493.

A finalizing thread 496 uses the status from the finalizing queue 495 to update the download and upload status on the persistent store 150.

The subject matter described herein may be computer-implemented in a suitable system by providing computer-executable instructions stored on a non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic energy, radio frequency signals, acoustic or light waves, such as those generated during radio wave and infrared data communications.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery. A computer software product may be an independent application with data input and data display modules. Alternatively, computer software products may be classes that are instantiated as distributed objects, or component software such as Java Beans or Enterprise Java Beans (both by Oracle Corporation). In one embodiment, the subject matter described herein is embodied as a computer program product which stores instructions, such as computer code, that when executed by a computer cause the computer to perform the processes and/or techniques described below.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for sharing and synchronizing content between a content repository and a file sharing service, executed by a processor, comprising:
  publishing content from the content repository to the file sharing service, wherein other computing devices connected to the file sharing service can share the content;
  synchronizing changes made to content at either the file sharing service or the repository;
  monitoring the file sharing service for new content or changes made to existing content, and to download the new content or changes made to existing content at the file sharing service to the content repository; and monitoring the content repository for new content or changes made to existing content, and to upload the new content or changes made to existing content at the content repository to the file sharing service.

2. The method of claim 1, further comprising:
monitoring the content repository for new content or changes made to existing content; and
uploading the new content or changes made to existing content at the content repository to the file sharing service.

3. The method of claim 1, further comprising:
monitoring the file sharing service for new content or changes made to existing content; and
downloading the new content or changes made to existing content at the file sharing service to the content repository.

4. The method of claim 1, further comprising:
enabling a plurality of threads and queues configured to monitor the content repository and the file sharing service in order to detect changes made to content, and to process the changes made to content in parallel.

5. The method of claim 4, further comprising:
enabling a first thread, the first thread configured to monitor the content repository and the file sharing service in order to detect changes made to content, and to sort the changes made to content;
storing the sorted changes from the first thread into a first queue;
enabling a second thread, the second thread configured to receive and filter the sorted changes;
storing the filtered sorted changes from the second thread into a second queue;
enabling a third thread, the third thread configured to receive the filtered sorted changes, and to transfer the filtered sorted changes to either the file sharing service or the repository;
storing the status of the changes made to content in a third queue; and
enabling a fourth thread, the fourth thread configured to maintain and update content status based on the status recorded in the third queue.

6. The method of claim 5, the step of enabling a second thread further comprising enabling a plurality of second threads configured to receive a plurality of the sorted changes from the first queue in parallel, and to filter the sorted changes in parallel.

7. The method of claim 5, the step of enabling a third thread further comprising enabling a plurality of third threads configured to receive a plurality of the filtered sorted changes from the second queue in parallel, to transfer the filtered sorted changes from each of the third threads to either the file sharing service or the repository, and to record the status of the changes made to content in a third queue.

8. The method of claim 5, further comprising:
storing the filtered sorted changes from the second queue into a persistent store.

9. A non-transitory computer-readable storage medium encoded with instructions executable by a processor, for performing a method for sharing and synchronizing content between a content repository and a file sharing service, the instructions comprising:
publishing content from the content repository to the file sharing service, wherein other computing devices connected to the file sharing service can share the content;
synchronizing changes made to content at either the file sharing service or the repository
monitoring the file sharing service for new content or changes made to existing content, and to download the new content or changes made to existing content at the file sharing service to the content repository; and
monitoring the content repository for new content or changes made to existing content, and to upload the new content or changes made to existing content at the content repository to the file sharing service.

10. The computer-readable storage medium of claim 9, further comprising:
monitoring the content repository for new content or changes made to existing content; and
uploading the new content or changes made to existing content at the content repository to the file sharing service.

11. The computer-readable storage medium of claim 9, further comprising:
monitoring the file sharing service for new content or changes made to existing content; and
downloading the new content or changes made to existing content at the file sharing service to the content repository.

12. The computer-readable storage medium of claim 9, further comprising:
enabling a plurality of threads and queues configured to monitor the content repository and the file sharing service in order to detect changes made to content, and to process the changes made to content.

13. The computer-readable storage medium of claim 12, further comprising:
enabling a first thread, the first thread configured to monitor the content repository and the file sharing service in order to detect changes made to content, and to sort the changes made to content;
storing the sorted changes from the first thread into a first queue;
enabling a second thread, the second thread configured to receive and filter the sorted changes;
storing the filtered sorted changes from the second thread into a second queue;
enabling a third thread, the third thread configured to receive the filtered sorted changes, and to transfer the filtered sorted changes to either the file sharing service or the repository;
storing the status of the changes made to content in a third queue; and
enabling a fourth thread, the fourth thread configured to maintain and update content status based on the status recorded in the third queue.

14. The computer-readable storage medium of claim 13, the step of enabling a second thread further comprising enabling a plurality of second threads configured to receive a plurality of the sorted changes from the first queue in parallel, and to filter the sorted changes in parallel.

15. The computer-readable storage medium of claim 13, the step of enabling a third thread further comprising enabling a plurality of third threads configured to receive a plurality of the filtered sorted changes from the second queue in parallel, to transfer the filtered sorted changes from each of the third threads to either the file sharing service or the repository, and to record the status of the changes made to content in a third queue.

16. The computer-readable storage medium of claim 13, further comprising:
  storing the filtered sorted changes from the second queue into a persistent store.

17. An apparatus for sharing and synchronizing content between a content repository and a file sharing service comprising:
  an application server including at least one processor, the processor programmed with executable instructions, which when executed by the processor cause the processor to (i) publish content from the repository to the file sharing service so that other computing devices connected to the file sharing service can share the content; (ii) synchronize changes made to content at either the file sharing service or the repository; (iii) monitor the file sharing service for new content or changes made to existing content, and to download the new content or changes made to existing content at the file sharing service to the content repository; and monitor the content repository for new content or changes made to existing content, and to upload the new content or changes made to existing content at the content repository to the file sharing service.

18. The apparatus of claim 17, the connector engine further comprising:
  a plurality of threads and queues configured to monitor the content repository and the file sharing service in order to detect changes made to content, and to process the changes made to content in parallel.

19. The apparatus of claim 18, the connector engine further comprising:
  a first thread configured to monitor the content repository and the file sharing service in order to detect changes made to content, and to sort the changes made to content;
  a first queue storing the sorted changes from the first thread;
  a second thread configured to receive and filter the sorted changes from the first queue;
  a second queue storing the filtered sorted changes from the second thread;
  a third thread configured to receive the filtered sorted changes from the second queue, and to transfer the filtered sorted changes to either the file sharing service or the repository;
  a third queue storing the status of the changes made to content from the third thread; and
  a fourth thread configured to maintain and update content status based on the status recorded in the third queue.

* * * * *